United States Patent [19]
Ikeura

[11] 4,344,398

[45] Aug. 17, 1982

[54] IDLE SPEED CONTROL METHOD AND SYSTEM FOR AN INTERNAL COMBUSTION ENGINE OF AN AUTOMOTIVE VEHICLE

[75] Inventor: Kenji Ikeura, Yokosuka, Japan

[73] Assignee: Nissan Motor Company, Limited, Kanagawa, Japan

[21] Appl. No.: 154,048

[22] Filed: May 28, 1980

[30] Foreign Application Priority Data

May 29, 1979 [JP] Japan .................................. 54-65661

[51] Int. Cl.[3] .......................... F02M 7/00; F02D 1/04; F02D 5/02; G06F 7/70

[52] U.S. Cl. .................................... 123/339; 123/445; 123/440; 123/585

[58] Field of Search ............... 123/339, 440, 445, 585, 123/351-356, 586, 587, 588, 589, 395, 349, 489

[56] References Cited

U.S. PATENT DOCUMENTS

| | | | |
|---|---|---|---|
| 3,964,457 | 6/1976 | Coscia | 123/339 |
| 4,167,924 | 9/1979 | Carlson et al. | 123/440 |
| 4,203,395 | 5/1980 | Chromas et al. | 123/339 |
| 4,240,145 | 12/1980 | Yano et al. | 123/585 |
| 4,241,710 | 12/1980 | Peterson, Jr. et al. | 123/440 |
| 4,242,994 | 1/1981 | Keely | 123/339 |
| 4,252,098 | 2/1981 | Tomczak et al. | 123/445 |

*Primary Examiner*—Raymond A. Nelli
*Attorney, Agent, or Firm*—Lowe, King, Price & Becker

[57] ABSTRACT

Disclosed herewith an intake air flow rate control system for an internal combustion engine of an automotive vehicle, in which a pulse duty of a control pulse signal is determined corresponding to a reference engine speed and an actual engine speed, the reference engine speed being determined corresponding to an engine or engine coolant temperature. Varying of the control ratio is limited by a means for controlling the varying rate of the control ratio. In the present system, the control ratio as the sum of feedback rate and open loop rate is limited within a given range. The control ratio is limited within a range 10 to 80% preferably of the pulse duty of the control pulse signal. In the given range, a means for controlling air amount flowing through a bypass passage which bypasses a throttle valve provided in an air intake passage, can respond without causing delay.

17 Claims, 7 Drawing Figures

IDLE SPEED CONTROL METHOD AND SYSTEM FOR AN INTERNAL COMBUSTION ENGINE OF AN AUTOMOTIVE VEHICLE

BACKGROUND OF THE INVENTION

1. Field of the Invention

The present invention relates generally to an idle speed control method and system for an internal combustion engine of an automotive vehicle. More particularly, the present invention relates to a control method and system for controlling idle speed by controlling an intake air flow rate, including correcting a control value which corresponds to the duty cycle of a pulse signal to be applied to a mechanical air flow rate control means electrically operative in response to the control value is thereby limited to prevent its entering into the deadband of the mechanical means.

2. Description of the Prior Art

In recent years, pollution of the atmosphere by nitrogen oxides $NO_x$, carbon monoxide CO, gaseous sulfurous acid and so on produced in the exhaust gas of automotive vehicles has become a serious problem. In addition the price of automotive fuel, i.e. gasoline or petrol, has increased. To prevent atmospheric pollution caused by automotive exhaust gas and to promote fuel economy, it has become necessary to accurately control engine speed even when the vehicle engine is idling.

In order to control idle speed by controlling the air flow rate, it is known to provide in the air intake passage an electrically operative mechanical air flow rate control means, such as electromagnetic valve means. Generally speaking, such mechanical means operates in response to application of a pulse signal indicative of a pulse duty cycle. The pulse duty cycle, used to determine the ratio of energizing period and deenergizing period of the mechanical means, is defined as the pulse ratio in one cycle of pulse signal to be input to the mechanical means. Depending on the pulse width of the pulse signal, the control value is determined by the duty cycle to control opening and closing of the valve means. The mechanical air flow rate control means includes dead bands or zones wherein the operating characteristics thereof, responsive to varying of the pulse duty cycle are significantly lessened. When the control ratio enters the dead band range of the mechanical means, a response delay occurs. For example, as shown in FIG. 3, control signal $S_3$ is determined by the sum of an open loop control signal $S_1$ and a closed loop control signal $S_2$. The open loop control signal $S_1$ corresponds to the engine or coolant temperature and the closed loop control signal $S_2$ corresponds to the difference between the actual engine speed and a reference engine speed determined as a function of coolant temperature. In response, to increasing of engine speed and increasing of the engine temperature, the control signals $S_1$, $S_2$ of both the open loop and the closed loop controls are decreased gradually to enter into the dead band of the mechanical means which is either above a maximum rate $K_H$ or below a minimum value $K_L$.

In the conventional system, upon starting the engine at time $T_1$, the air flow rate is controlled by feedback control within a period of time $W_1$, and is increased corresponding to the required rate. Thereafter the pulse signal duty cycle, represented by the control value is gradually reduced to the normal control value. However, at this time, if the vehicle is driven at point $T_2$ so that open loop control is carried out, the feedback signal $S_2$ is fixed at its value immediately before starting the vehicle. Since, at this time, the engine speed is gradually decreased from the initial value by feedback control, the feedback control signal $S_2$ is negative during the period $W_1$ and therefore the fixed closed loop control signal $S_2$ is also negative after time $T_2$. On the other hand, according to increasing engine temperature, the open loop control signal $S_1$ is decreased after $T_2$. However, in the open loop control, the control value is not decreased to a value less than zero as represented by $S_3'$ in FIG. 3. The control signal $S_3$ is thus fixed at zero. Accordingly, the control value of $S_3$ enters into the dead band $S_4$ of the mechanical means, so that a delay in response results. If, at point $T_3$, after driving the vehicle for a period of time $W_2$, the engine returns to idling, then the control operation is switched to closed loop control. At this time, the feedback control signal $S_2$ is maintained at the previously fixed value which is less than zero. In response to the switching of the control operation and the lack of the air flow rate, the closed loop control value of $S_3$ will increase rapidly to follow the change of required air flow rate. However, at this time, with the control value of $S_3$ being less than the minimum value $K_L$ of the dead band of the mechanical valve means, the response characteristic of the mechanical valve means is quite low for a time period $\tau$, thereby failing to permit sufficient increase of the air flow rate. As a result, the engine may possibly stall.

To prevent such a possibility of delay of response, and to improve response characteristics of the mechanical means, it will be required to limit the range of control values so that the mechanical valve means can respond to variation of the control value without substantial delay. In the present invention, therefore, the control value is limited to be within a range of 10 to 80 percent of the maximum control value assuming a value of 100 percent to represent one cycle of pulse signal.

SUMMARY OF THE INVENTION

Therefore, it is an object of the present invention to provide an idle speed intake air flow rate control method and system for an automotive vehicle, wherein the control value formed as the sum of the closed loop rate and the open loop rate is limited. In the control system of the present invention, a control value which is either excessively lower or higher than the limits therefor is corrected to the maximum or minimum values.

Another object of the present invention is to provide a means for defining the maximum and minimum values of the control value and for correcting the ratio of the pulse duty of the pulse signal within the given range in order to improve response characteristics of the control operation in the air flow rate control system.

to accomplish the above-mentioned and other objects, there is provided an intake air flow rate control method and system for an internal combustion engine of an automotive vehicle, in which a control value is determined corresponding to a reference engine speed and to the actual engine speed, the reference engine speed being determined corresponding to a coolant or engine temperature. Variation of the duty cycle of the pulse signal is limited by a means for controlling the variation rate of the control value. In the present system, the duty cycle of the pulse signal as the sum of control values of the closed loop control signal and the open loop control signal is limited to be within a given range.

According to the preferred embodiment of the present invention, the control value is limited to be within a range of 10 to 80 percent of the pulse duty, so that the variation of the control value may not enter into the dead band of an electrically responsive air flow rate control means, such as electromagnetic valve means.

The other objects and advantages sought in the present invention will become apparent from descriptions given hereinbelow.

BRIEF DESCRIPTION OF THE DRAWINGS

The present invention will become more fully understood from the detailed description given below, and from accompanying drawings of the preferred embodiment of the present invention, which however, are not to be taken limitative of the present invention in any way, but are for the purpose of elucidation and explanation only.

In the drawings.

DESCRIPTION OF THE PREFERRED EMBODIMENT

Figure 1:
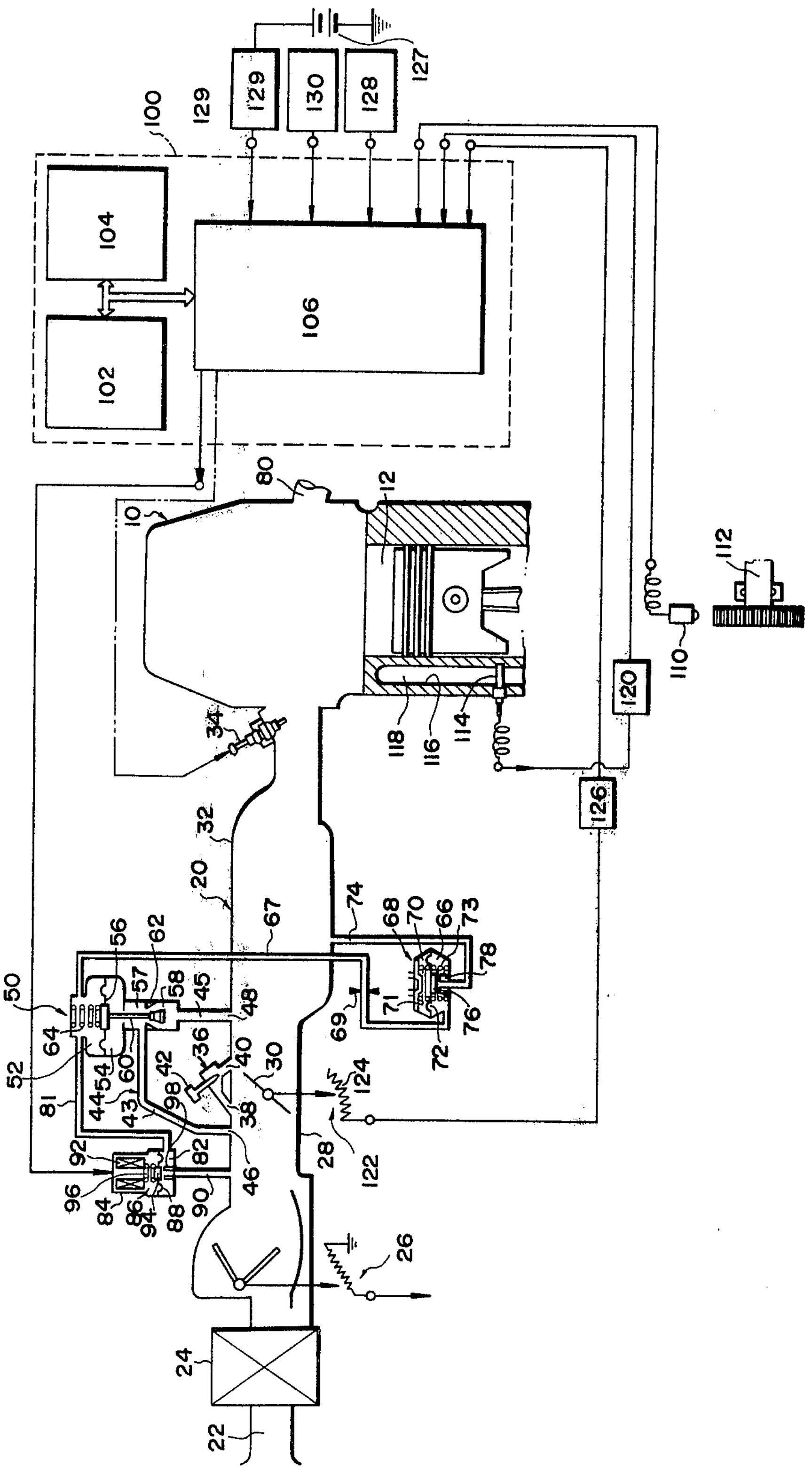
FIG. 1 is a diagrammatical illustration of an intake air flow rate for an internal combustion engine according to a preferred embodiment of the present invention.

Referring to FIG. 1, there is shown a general construction of an automotive internal combustion engine having a computer controlled fuel injection system: an air flow rate control method and system according to the present invention is shown as applied to the internal combustion engine, for purposes of explanation only, and should not be taken to restrict the scope of the present invention. Before moving onto the detailed description, it should be appreciated that the air flow rate control system according to the present invention will be applicable to any type of internal combustion engine which can be controlled by a microcomputer mounted on the vehicle.

In FIG. 1, each of engine cylinders 12 of an internal combustion engine 10 communicates with an air intake passage generally designated by 20. The air intake passage 20 comprises an air intake duct 22 with an air cleaner 24 for cleaning atmospheric air, an air flow meter 26 provided downstream of the air intake duct 22 to measure the amount of intake air flowing therethrough, a throttle chamber 28 in which is disposed a throttle valve 30 cooperatively coupled with an accelerator pedal (not shown), so as to adjust the flow rate of intake air flowing therethrough, and an intake manifold 32 having a plurality of branches "not clearly shown in FIG. 1". Although not clearly illustrated in FIG. 1, the air flow meter is incorporated with another engine control system that determines, for example, the fuel injection rate. A fuel injector 34 is provided on the intake manifold 32. The rate of fuel injection through fuel injector 34 is controlled by an actuating means, such as an electromagnetic actuator (not shown). The actuating means is electrically operated by the other control system which determines fuel injection rate, fuel injection timing and so on corresponding to the engine condition sensed by various engine parameter sensing means. It should be noted that, although the fuel injector 34 is disposed on the intake manifold 32 in the embodiment shown, it is possible to locate the injection in combustion chamber 12 in a per se well known manner.

An idle port passage 36 opens into the throttle chamber 28. One end port 38 of the idle port passage 36 opens upstream of the throttle valve 30. The other end port 40 opens downstream of the throttle valve 30 so that the idle port passage 36 bypasses the throttle valve. An idle adjusting screw 42 is provided in the idle port passage 36. The idle adjusting screw 42 is manually operable, so as to initially adjust the flow rate of intake air flowing through the idle port passage 36. A bypass passage 44 also communicates with intake air passage 20. One end 46 of the bypass passage 44 opens between the air flow meter 26 and the throttle valve 30 and the other end 48 opens downstream of the throttle valve 30, adjacent the intake manifold 32. Thus, the passage 44 bypasses throttle valve 30 and connects the upstream region of the throttle valve 30 to the intake manifold 32.

An idle control valve, generally designated by 50, is provided in bypass passage 44. Valve 50 generally comprises two chambers 52 and 54 separated by a diaphragm 56. Chamber 54 communicates with the atmosphere. Bypass passage 44 is thereby separated by the valve means 50 into two portions 43 and 45 respectively located upstream and downstream of the port 57 of the valve 50. The valve means 50 includes a poppet valve 58 disposed within the portion 57. Valve 58 is movable between two positions, in one position the valve enables communication between portions 43 and 45 of passage 44 and the other position closes same. The poppet valve element 58 has a stem 60 whose end is secured to the diaphragm 56 for cooperative movement therewith. Diaphragm 56 is biased downwardly in the drawing, so as to release the valve element 58 from a valve seat 62, by a helical compression coil spring 64 disposed within the chamber 52 of the valve means 50. Therefore, the valve 50 is normally open to allow communication between portions 43 and 45 of bypass passage 44 through valve port 57.

Chamber 52 of valve 50 communicates with a chamber 66 of a pressure regulating valve 68 as the constant vacuum source through a vacuum passage 67. The pressure regulating valve 68 is separated into two chambers 66 and 70 by a diaphragm 72. Chamber 66 of valve 68 also communicates with intake manifold 32 to introduce vacuum from the manifold thereinto, through a passage 74. The chamber 70 is open to the atmosphere in a well known manner. A valve member 76 is secured to diaphragm 72 which is opposed to a valve seat 78 provided at end of passage 74. In the chambers 66 and 70 there are respectively disposed helical compression coil springs 71 and 73. Springs 71 and 73 are generally of equal spring pressure to bias diaphragm 72 into a neutral position. Although not shown, it will be noted that chamber 66 can also be connected with a exhaust-gas recirculation (EGR) control valve which recirculates a part of the exhaust gases flowing through an exhaust passage 80 to the intake manifold 32.

Diaphragm 72 is moved upwards or downward due to changes of balance between the vacuum in chamber 66 and atmospheric pressure introduced into chamber 70. Through movement of diaphragm 72, valve member 76 is moved toward or away from valve seat 78, so as to regulate a reference vacuum for the idle control valve 50. The reference vacuum regulating in the pressure regulating valve means 68 is introduced to the chamber 52 of the idle adjusting valve means 50 through the vacuum passage 67 with an orifice 69. The orifice 69 controls varying of vacuum flowing into chamber 52 for smooth valve operation.

Chamber 52 of idle control valve 50 also communicates with a chamber 82 of an intake air valve 84 through an air passage 81. The intake air valve 84 is divided into two chambers 82 and 86 by a diaphragm 88. The chamber 82 also communicates with air intake passage 20 upstream of throttle valve 30 through a passage 90.

An electromagnetic actuator 92 is disposed within chamber 86 and is electrically operated in response to a train of pulse signals generated with a control signal from a control signal generator in a hereinafter described control unit in use with a microcomputer. On the diaphragm 88 is provided a valve member 94 which is electromagnetically moved by actuator 92. In practice, by varying the pulse width based on the control signal, the ratio of the energized period and deenergized period of the actuator 92 is varied. Therefore, the ratio of the opening period and the closing period of the valve 94 is varied so as to control the flow rate of the air flowing through the intake air valve 84. In the chamber 86 there is further provided a helical compression coil spring 96 which biases the diaphragm together with the valve member 94 toward end of the passage 90, so as to seat valve member 94 onto a valve seat 98 provided at end of the passage 90. From the vacuum of pressure regulating valve 68, diaphragm 56 and valve element 58 are moved to control the flow of air through bypass passage 44. The vacuum in chamber 52 is controlled by controlling the flow rate of air flowing through intake air valve 84 and air passage 81.

When internal combustion engine 10 is idling, throttle valve 30 is generally closed to restrict the flow of intake air therethrough. Therefore, during idling condition of internal combustion engine 10, the intake air substantially flows through both idle port passage 36 and bypass passage 44, bypassing throttle valve 30 and connecting the upstream and downstream regions of the throttle valve. Air flow rate through the idle port passage 36 is adjusted with idle adjusting screw 42, and the air flow rate through bypass passage 44 is generally controlled with idle control valve 50. Idle control valve 50 is operated by vacuum fed from intake manifold 32 through passage 74, pressure regulating valve 68, and vacuum passage 67. Vacuum in chamber 52 is adjusted by the atmospheric intake air flowing thereinto through passage 90, electromagnetic valve 84 and passage 81. Valve element 58 is operated to control the air flow rate flowing through passage 44 by the vacuum within the chamber 52. Since engine speed depends on the intake air flow rate, it can thus be controlled by controlling the air flow rate through idle port passage 36 and bypass passage 44 when internal combustion engine 10 is idling.

It should be noted that, although the control operation for adjusting the intake air flow rate can be performed by controlling electromagnetic actuator 92 as described hereafter, controlling of air flow rate, and thus control of engine speed during idling condition of the internal combustion engine 10, can also be carried out by controlling the idle adjusting screw 42. The idle adjusting screw 42 is controlled manually to determine an initial air flow rate during engine idling.

In, returning to FIG. 1, a microcomputer, generally designated with reference numeral 100, is shown for automatically controlling the air flow rate. Microcomputer 100 generally comprises a central processing unit (CPU) 102, a memory unit 104, and an input/output unit 106 (i.e. an interface). As inputs to microcomputer 100, there are various sensor signals, such as:

a crank pulse and a crank standard pulse, the crank pulse being generated at every one degree or predetermined amount of the crank angle, and the crank standard pulse being generated at every given crank standard angle by a crank angle sensor 110 detecting the amount of rotation of a crank shaft 112; the crank pulse and the crank standard pulse are input to indicate engine speed and engine crank position;

a coolant temperature signal produced by a temperature sensor 114 inserted into a coolant passage 116 provided around engine cylinder 12, and exposed to coolant 118; the temperature sensor 114 generates an analog signal in response to coolant temperature and feeds this signal to input/output unit 106 through an analog-digital converter (A/D converter) 120, in which the coolant temperature signal is converted into a digital code or a binary number signal for input to the microcomputer.

a throttle valve angle signal converted into digital code by an A/D converter 126, the signal being derived from an analog signal produced by a throttle valve angle sensor 122 that includes a variable resistor 124;

a signal from a transmission neutral switch 128 which is input in the form of an ON/OFF signal;

a vehicle speed signal, fed from a vehicle speed sensor 130, that is an ON/OFF signal which indicates ON when the vehicle speed is lower than a given speed, e.g., 8 kph, and is otherwise off;

and a battery voltage signal, fed from the battery 127 through the A/D converter 129.

It will be appreciated that, although, in the shown embodiment, there is employed a variable resistor 124 in the throttle valve angle sensor 122 for detecting the closed position of the throttle valve, an ON/OFF switch could substitute for the variable resistor 124, which could become ON when the throttle valve 30 is in the closed position.

Figure 2:
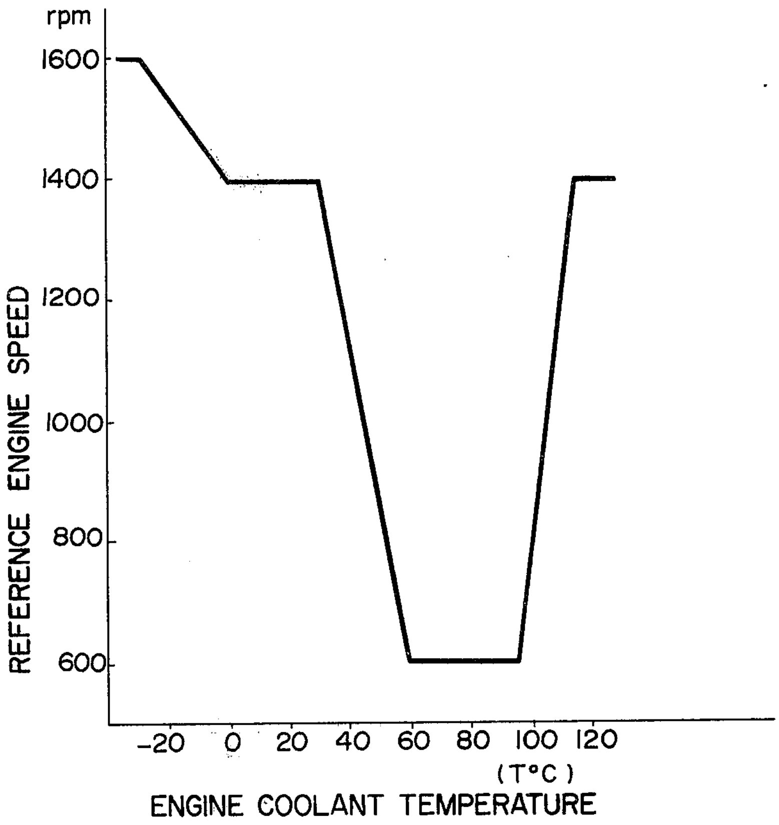
FIG. 2 is a graph showing varying of a reference engine speed corresponding to an engine coolant temperature.

FIG. 2 shows a relationship between the coolant temperature T and the reference engine speed $N_{SET}$, as an example of a control parameter, under the condition of open-loop control, according to the present invention. The reference engine speed $N_{SET}$ is the desirable engine speed corresponding to the coolant temperature. The pulse duty of the pulse signal applied to the actuator 92 is determined based on the control signal which corresponds to the reference engine speed $N_{SET}$ in open-loop control. Although the control characteristics according to the present invention is described hereafter with reference to an example using the coolant temperature as a control parameter to determine the desired reference engine speed $N_{SET}$, it will be possible to use other factors as the control parameter. For example, engine temperature can also be used as the control parameter for determining the reference engine speed $N_{SET}$.

As shown in FIG. 2, according to the present invention, in a normal driving condition in which the coolant is warmed-up to 60° C. to 95° C., the idling engine speed is maintained at 600 r.p.m. When the coolant temperature is higher than the abovementioned normal range and is over-heated, the reference idling engine speed is increased to the maximum 1400 r.p.m. so as to increase coolant velocity and to increase the amount of cooling air passing a radiator (not shown) for effectively cooling the internal combustion engine. On the other hand, if the coolant temperature is lower than that of the normal range, the reference idling speed is also increased to the maximum 1600 r.p.m. so as to warm-up the engine rapidly and to stabilize idling engine speed in the cold engine. One of the most important concepts of the present invention is to specify the reference engine speed at a specific cold temperature of the coolant. According to the present invention, the specific temperature range is 0° C. to 30° C. and the specific reference engine speed in the specific temperature range is 1400 r.p.m. The specific reference engine speed is kept constant within the abovementioned specific temperature range. The reason for specifying the coolant temperature range and constant engine speed within this range is that, except in extraordinarily cold weather, the coolant temperature is normally in this range when the engine is started first.

For practical control operation with a microcomputer, the reference engine speed is determined in either of two ways; i.e., open-loop control or closed loop control. In closed loop control, the pulse duty (the ratio of the pulse width to one pulse cycle) of the pulse signal to be fed back to the electro-magnetic valve means 84 is determined based on the control signal which does not correspond to the reference engine speed $N_{SET}$ as in open-loop control and is determined according to the difference between the actual engine speed and the reference engine speed. The closed loop control is carried out according to the position of the throttle valve detected or measured by the throttle valve angle sensor 122, the position of the transmission detected by the neutral switch 128, the vehicle speed detected by the vehicle speed switch sensor 130 and so on. In any case, the closed loop control to be carried out will be determined with reference to vehicle driving conditions which will be preset in the microcomputer, for example, the condition in which the throttle valve is closed and the transmission is in neutral position or the condition in which the throttle valve is closed and the vehicle speed is below 8 km/h. When the vehicle driving condition is not adapted to carry out closed loop control, then the microcomputer performs open loop control by table look-up. In open loop control, the reference engine speed $N_{SET}$, i.e. the control signal, is determined with reference to the coolant temperature by table look-up. As apparent from the above, the control signal is the signal which determines the duty cycle of the pulse signal.

The table data is stored in the ROM of the memory unit 104. The table data are looked-up according to the coolant temperature. The table, in accordance with the graph of FIG. 2, shows the relationship between the coolant temperature (TW) and corresponding reference engine speed $N_{SET}$, when the table is preset in 32 bytes of ROM.

It should be appreciated that the engine speed is increased in steps of 12.5 r.p.m. If the coolant temperature is intermediate between two given values, the reference engine speed $N_{SET}$ will be determined by interpolation.

The microcomputer 100 determines an actual engine speed $N_{RPM}$ based on the crank angle sensor signal generated by the crank angle sensor 110. The actual engine speed $N_{RPM}$ is compared with the reference engine speed $N_{SET}$ determined as stated above to obtain a difference $\Delta N$ therebetween. Based on the actual engine speed $N_{RPM}$ and the difference $\Delta N$, the microcomputer 100 determines a proportional constant of a proportional element of a control signal generator and an integral constant of an integral element of the control signal generator. Corresponding to the determined proportional constant and the integral constant, a duty cycle of a pulse signal is determined to control the ratio of energized period and deenergized period of the actuator 92 to thereby control air flow rate flowing through bypass passage 44.

On the other hand, microcomputer 100 determines engine driving condition with respect to the types of transmission, on or off position of the transmission neutral switch 128, on or off position of the throttle valve angle sensor 122, on or off position of the vehicle speed switch and whether the fuel supply system is in full shut off position.

When throttle valve angle sensor 122 detects a closed position of throttle valve 30 and the engine is running in stable condition, the microcomputer 100 carries out closed loop control. Otherwise, the microcomputer carries out open loop control. In open loop control, the control signal $S_3$ includes closed loop rate $S_2$ and open loop rate $S_1$. In closed loop control, closed loop rate $S_2$ correspondingly varies with the actual engine speed $N_{RPM}$ and the difference $\Delta N$ between the actual engine speed $N_{RPM}$ and the reference engine speed $N_{SET}$ so that the difference $\Delta N$ is reduced to zero.

As stated above, electromagnetic actuator 92 includes a dead band region in which the valve element is not actuated in response to the control output. Therefore, if the control signal is within a specific range which corresponds to the dead band, it is impossible to control the air flow rate and thereby control the idle engine speed. To avoid this problem, the duty cycle of the pulse signal is defined within a range between a maximum and a minimum ratio. To illustrate, if closed loop control signal $S_2$ is $\Delta I$, and open loop control signal $S_1$ is $I_{OUT}$, and, when control signal $S_3$ ($=\Delta I+I_{OUT}$) is equal to or less than a given minimum value $K_L$, (for example, 10% of the one cycle of the pulse signal) the closed loop control signal $S_2$ is corrected to $\Delta I=K_L-I_{OUT}$. Therefore, the control signal $S_3$ can also be limited at the given minimum value $K_L$. On the other hand, when the control signal $S_3$ is equal to or more than a given maximum value $K_H$, it is corrected at the maximum value so as not to exceed the maximum value. At this time, the closed loop control signal $S_2$ and the open loop control signal $S_1$ are not corrected. Thereby, the control signal may be prevented from entering the dead band of the actuator so as to continuously control the engine idle speed with respect to the given reference speed determined corresponding to conditions of various engine parameters.

Figure 4:
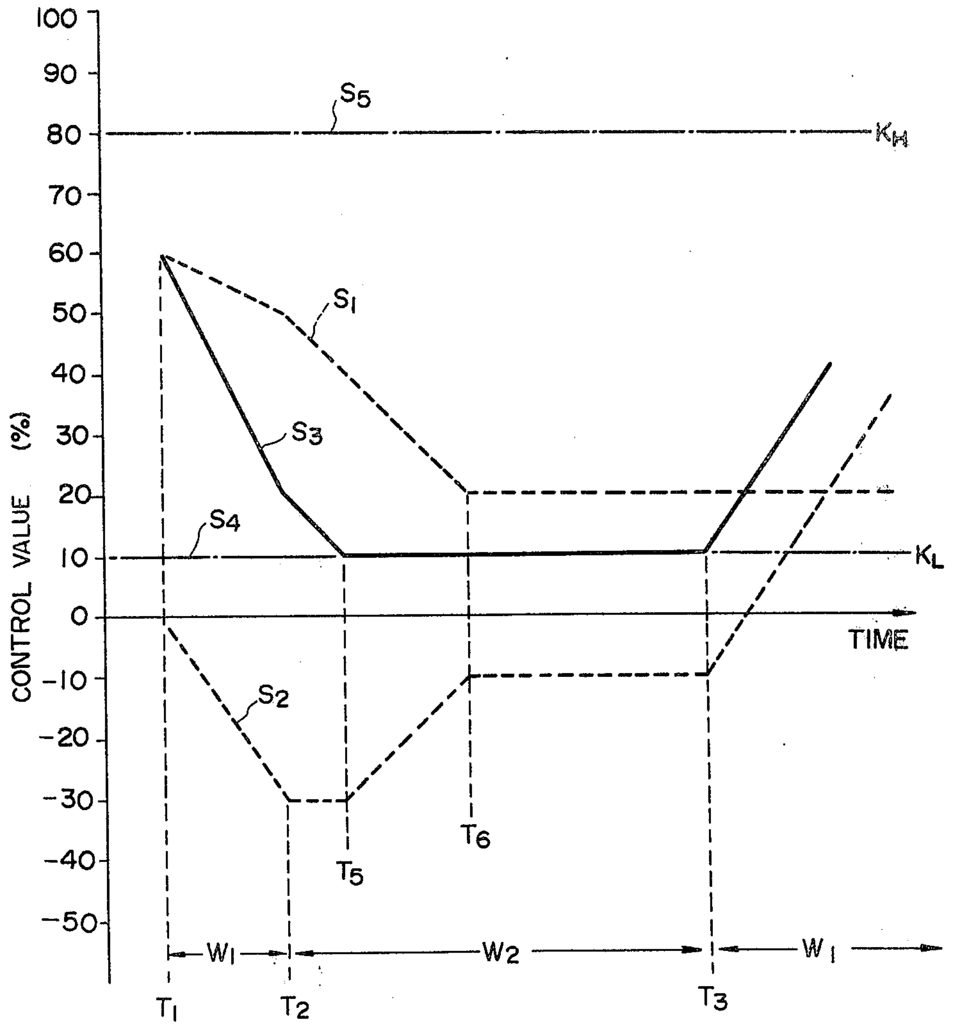
FIG. 4 is a graph similar to FIG. 3, but showing a limited control value according to the present invention, particularly when the control value is gradually decreasing.

FIG. 4 shows a graph illustrating relationship of the closed loop control signal $S_2$, the open loop control signal $S_1$, the control signal $S_3$ and the minimum value $K_L$. In this case, suppose the engine starts at time $T_1$. Initially both the closed loop control signal $S_2$ and the open loop control signal $S_1$ are relatively high when the engine load is relatively high. Thereafter, both $S_1$ and $S_2$ gradually decrease. According to this, the duty cycle of the pulse signal $S_3$ also decreases gradually. At point $T_5$ where the duty cycle of the pulse signal $S_3$ becomes equal to the minimum value $K_L$, then correction is made for correcting the closed loop control signal $S_2$ so that the value $\Delta I$ thereof is in a relationship described as $\Delta I = K_L - I_{OUT}$. Therefore, until point $T_6$ is reached where the open loop control signal $S_1$ stops decreasing, the control signal $S_2$ gradually increases in an inversely proportional manner to $S_1$ to maintain the control value $S_3$ equal to the minimum value $K_L$. At a point $T_3$, after carrying out open loop control for a period $W_2$, if closed loop control is carried out, and the control signal $S_2$ increases, the control signal $S_3$ is increased proportionally thereto. At this time, since the control value $S_3$ is not within the dead band (i.e., is not less than $S_4$) the actuator can immediately respond to vary actuation in response to increase of the control signal $S_3$. Thus, response delay is effectively eliminated to prevent the engine from stalling.

Figure 5:
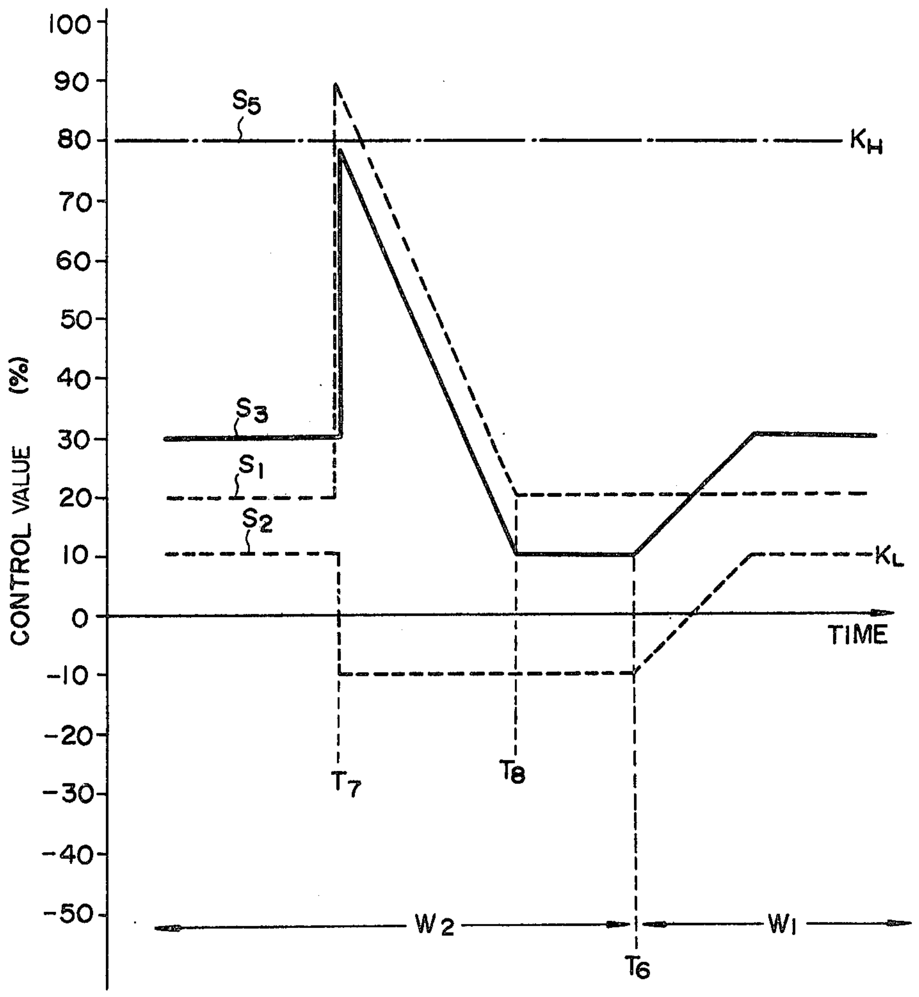
FIG. 5 is a graph also similar to FIG. 3, wherein showing a control value limited at the upper limit of the rate of varying the control value being limited at the maximum value of the control value.
Figure 6:
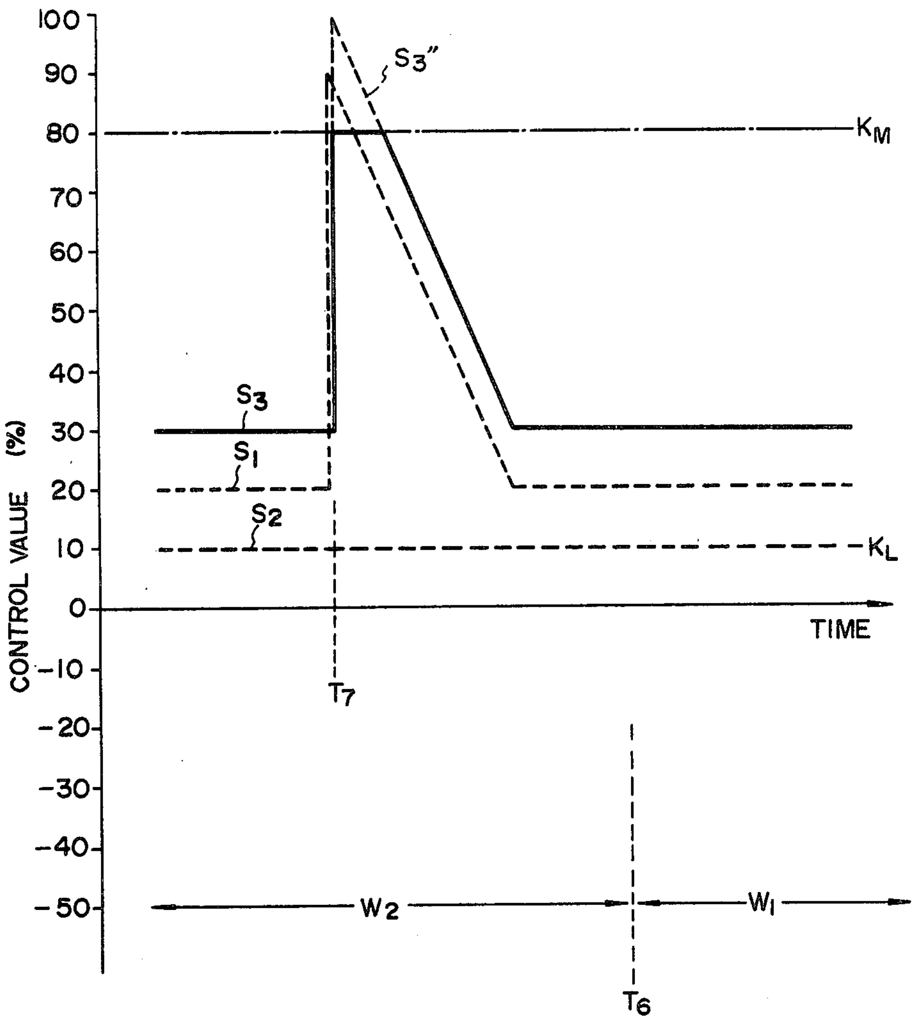
FIG. 6 is a graph also similar to FIG. 3, wherein is shown a limited control value limited at the maximum value by a modified method of FIG. 5.

FIGS. 5 and 6 respectively indicate the relationship between the control value and the given maximum ratio $K_H$, using the control system of the present invention. In FIG. 5, when the throttle valve is closed at a point $T_7$ while the vehicle is running under open loop control, and then the vehicle is decelerated, the correction of the control signal $S_3$ corresponding to an increase in the required air flow rate is carried out momentarily by increasing open loop control signal $S_1$. When the increased control value $S_3$ exceeds the maximum value $K_H$ by excessively increasing open loop control signal $S_1$, the closed loop control signal $S_2$ is corrected in accordance with the relationship $\Delta I = K_H - I_{OUT}$. In this system, when the open loop control signal $S_1$ is excessively high, the closed loop control signal $S_2$ is corrected to a substantially low value. This will possibly cause the engine to stall during gradual decreasing, the corrected control signal $S_3$. Namely, at a point $T_8$ when the open loop control signal $S_1$ is decreased the increased ratio in response to vehicle deceleration returns to normal value, however the control value signal $S_3$ becomes substantially lower causing the engine to stall. In this system, although at a point $T_6$ when the closed loop control is carried out, and the closed loop control signal $S_2$ is increased to the normal level, engine stall cannot be effectively prevented due to response delay between the points $T_8$ to $T_6$.

As shown in FIG. 6, according to the present invention, when the increased control value $S_3$ exceeds the given maximum value or ratio $K_H$ (i.e. the portion $S_3$" in the drawing), the control value $S_3$ is corrected to the maximum ratio $K_H$. At this time, the closed loop control signal $S_2$ is not corrected. Therefore, when the correction of control value $S_3$ in response to vehicle deceleration is completed, the control value $S_3$ can immediately return to the normal level to prevent the engine from stalling.

Figure 3:
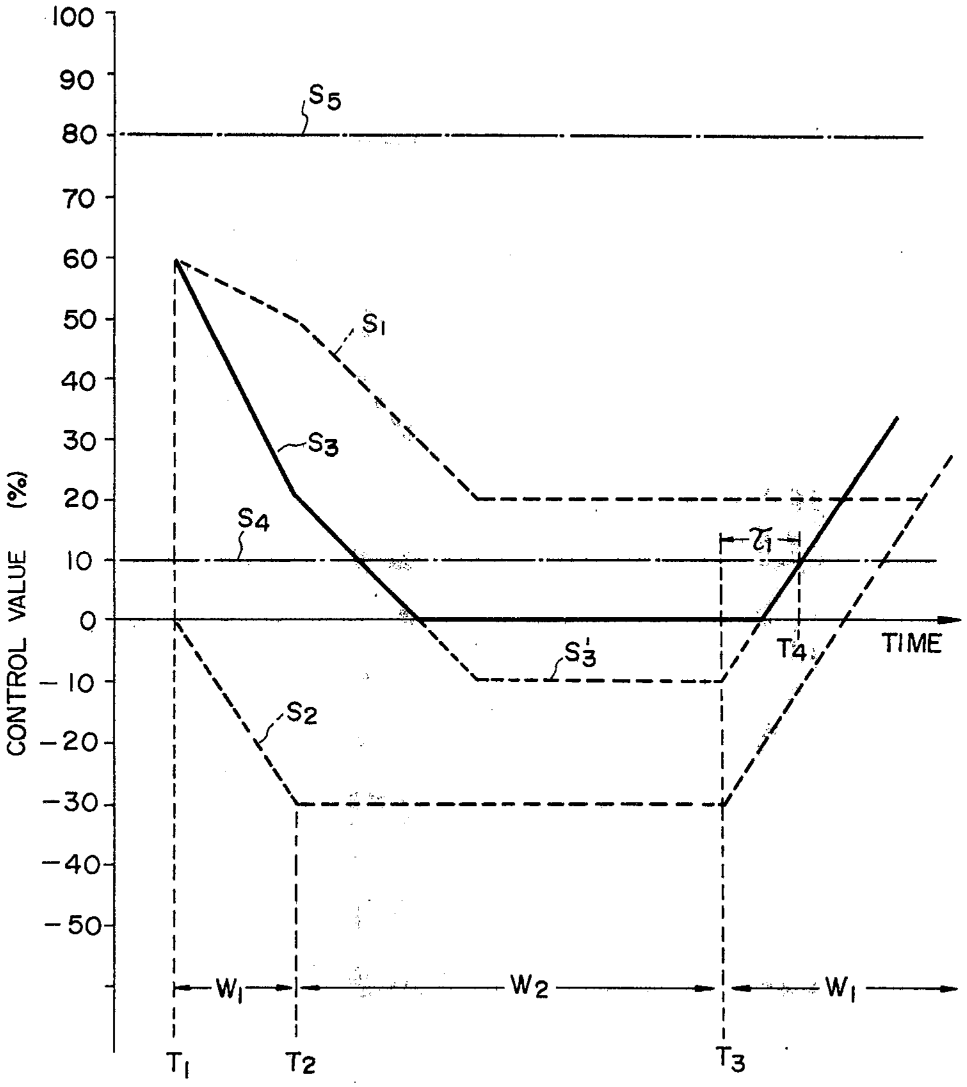
FIG. 3 is a graph showing a relationship of control value as a function of a closed loop rate and an open loop rate and a control signal as the sum of them.

It should be noted that correction of the control value in response to vehicle deceleration occurs rapidly to prevent stalling. Therefore, the time units shown in FIGS. 5 and 6 are substantially small in comparison with the units of FIG. 3.

Figure 7:
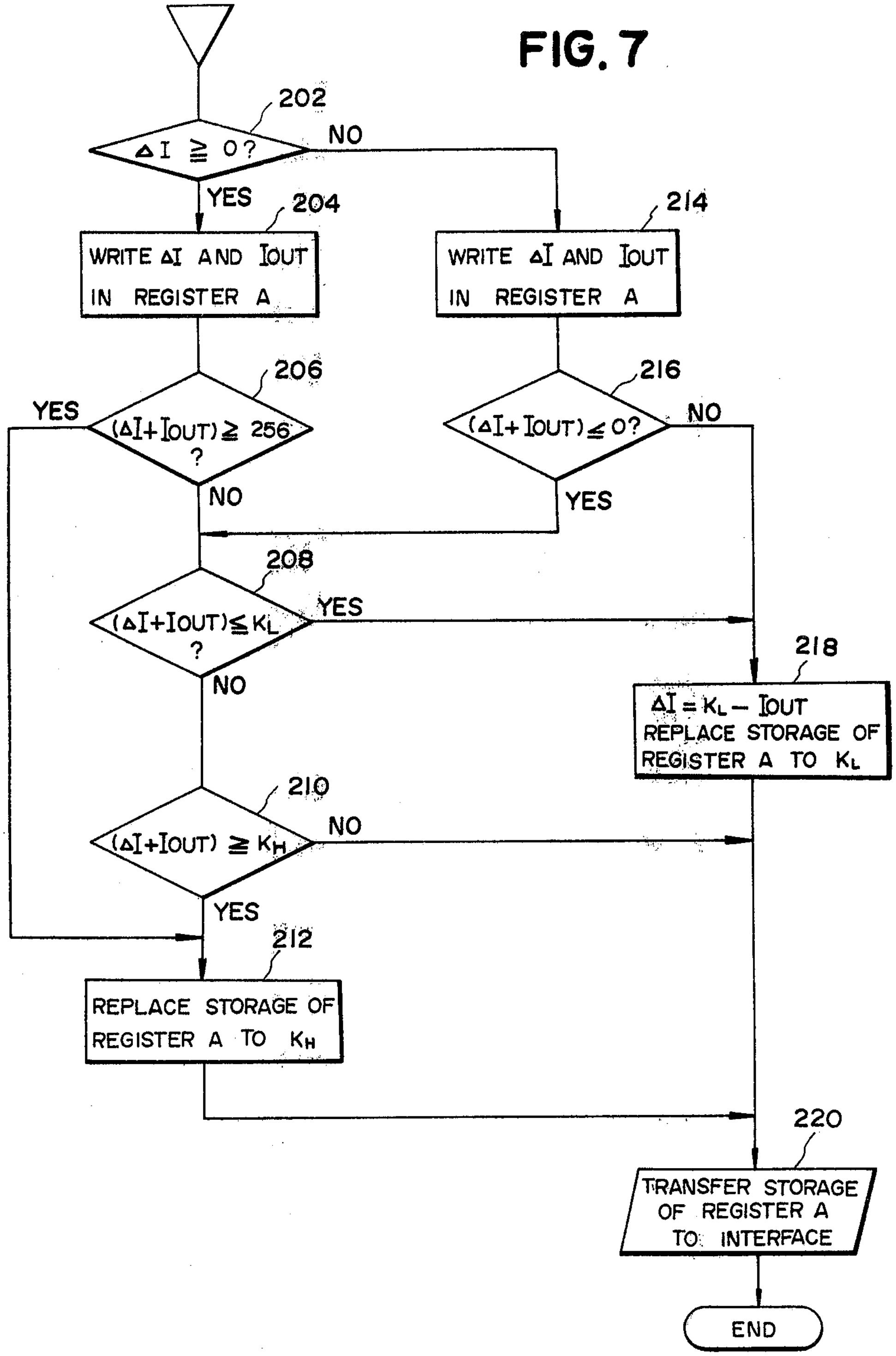
FIG. 7 is a flowchart of a control program for limiting the rate of varying the control value according to the given response characteristics as shown in FIGS. 3 to 5.

Referring now to FIG. 7, there is illustrated a program flowchart for correcting the control value with respect to the given minimum and maximum value ratios. This program is executed after running the correction program for the air flow rate corresponding to increasing of required rate upon accelerating or decelerating the vehicle. At a decision block 202, the closed loop control value $\Delta I$ is checked. If the closed loop control value $\Delta I$ is equal to or larger than 0, the sum of the closed loop control value $\Delta I$ and the open loop control value $I_{OUT}$ is set in the register A (see block 204). The sum stored in register A is checked at a decision block 206. When the sum exceeds a capacity of 8 bits, i.e., 256, the storage of register A is replaced by a constant maximum value $K_H$ (see block 212). If the sum is less than 256, it is compared with the minimum ratio $K_L$ at a decision block 28. When the sum is more than the minimum ratio $K_L$, it is further compared with the maximum ratio $K_H$ at a decision block 210. If the sum exceeds the maximum ratio, storage of the register A is replaced by the maximum ratio $K_H$ at the block 212.

If the closed loop control value $\Delta I$ is smaller than 0, the sum of the closed loop control value $\Delta I$ and the open loop control value $I_{OUT}$ is stored in register A (see block 214). Thereafter, the sum is compared with 0 at a decision block 216. When the sum is equal to or more than 0, the program skips to the decision block 208. At block 208, if the sum is equal or less than the minimum ratio $K_L$, the closed loop control value $\Delta I$ is corrected as $\Delta I = K_L - I_{OUT}$, at block 218. At block 218, the minimum ratio $K_L$ replaces the sum in the storage of register A. Likewise, when the sum is less than 0 at the decision block 216, the process of block 218 is carried out.

After the process of block 218 or 212 is performed, the storage of register A is transferred to the interface of the input/output unit to be output, at block 220. Likewise, when the sum is less than the maximum ratio $K_H$ at the block 210, namely the sum is an intermediate value between the minimum and maximum ratios, the sum in the storage of register A is transferred to the interface at block 220.

It should be appreciated that blocks 204 and 214 are provided to check the overflow of the sum of the feedback control value $\Delta I$ and the open loop control ratio $I_{OUT}$.

However, in the above-mentioned embodiment, since the minimum and maximum ratios are previously given to limit the range of varying the duty cycle of the pulse signal, it will be possible to directly control the air flow rate. Namely, since the electronically controlled fuel injection system includes a means for determining air flow rate, such as an air flow meter, the input from such air flow rate determining means can be used to define maximum and minimum ratios of the engine idling speed control.

Upon initiating closed loop control following open loop control, the engine load varies considerably depending on the operating position of the air conditioner and/or gear position of the transmission. Therefore, the required air flow rate is varied accordingly. If the response of the closed loop control corresponding to the required air flow rate cannot follow such requirement changes, it will possibly cause the engine to stall. Therefore, the open loop control signal is defined as the minimum ratio which the closed loop control can easily follow. At this time, irregular operation of various engine components may be considered to determine the minimum ratio. In this manner when control changes from closed loop control to open loop control while the control signal is lower than the minimum ratio, the control signal is corrected to the minimum ratio. However, if the closed loop control signal is excessively low with respect to the minimum ratio, increasing the control signal in the aforesaid manner, upon changing control from closed loop to open loop causes the engine to run unevenly and also increases the amount of harmful pollutants in the exhaust gas. To avoid this problem, according to the present invention, the control signal is increased in a stepwise manner; for example, 0.5% per 128 cycles of engine revolution, until the minimum is obtained.

Thus, the present invention has fulfilled all of the objects and advantages sought thereby. While the present invention has been shown and described with respect to a preferred embodiment, it should not, however, be considered as limited to that embodiment or any other embodiment. Further, variations could be made to the form and the details of any parts or elements, without departing from the principle of the invention.

What is claimed is:

1. A method for controlling idle air flow rate flowing through an idle air passage in an intake air flow rate control system for an internal combustion engine in which either one of closed loop control and open loop control is carried out selectively, said system including an idle control valve with an actuator being operative in response to a pulse signal that varies the ratio of an energized period and a deenergized period of said actuator according to the duty cycle of the pulse signal, said actuator having a normal duty cycle range in which it accurately follows variations of the duty cycle of said pulse signal without substantial delay, and dead bands in which said actuator causes substantial response delay with respect to variations of the duty cycle of the pulse signal, said dead bands defined by the duty cycle being higher than a predetermined maximum value or lower than a predetermined minimum value, said method comprising the steps of;

determining engine speed;

determining engine temperature;

determining an open loop control value based on a determined engine temperature;

determining a reference engine speed based on the determined engine temperature;

determining a closed loop control value based on the determined engine speed and a difference between the determined engine speed and a reference engine speed;

producing said pulse signal having said duty cycle representative of a predetermined relationship involving the determined open loop and closed loop control values for operation in open loop control;

presetting maximum and minimum values of said duty cycle of said pulse signal, the range between said maximum and minimum values defining said normal duty cycle range corresponding to said dead bands of said actuator; and correcting the duty cycle of said pulse signal to maintain same within said normal duty cycle range.

2. A method as set forth in claim 1, wherein said actuator is an electromagnetic actuator variably energized and deenergized in response to the ratio of the energized and deenergized periods of the duty cycle of the pulse signal applied thereto.

3. A method as set forth in claim 1 or 2, wherein said correcting step includes limiting said closed loop value so as to limit the duty cycle of said pulse signal to said minimum value when said duty cycle is less than the minimum value.

4. A method as set forth in claim 3, wherein said correcting step further includes fixing the duty cycle of said pulse signal at said maximum value.

5. A method as set forth in claim 4, wherein said maximum ratio is 80% of the duty cycle of said pulse signal and said minimum ratio is 10% of the duty cycle of said pulse signal.

6. A method for controlling idle air flow rate flowing through an idle air passage in an intake air flow rate control system for an internal combustion engine in which either one of closed loop control and open loop control is carried out selectively, said system including an idle air control valve with an actuator being operative in response to a pulse signal so that it varies the ratio of an energized period and a deenergized period of said actuator according to the duty cycle of the pulse signal, which actuator has a normal duty cycle range in which it accurately follows variations of the duty cycle of said pulse signal without substantial delay, and dead bands in which said actuator causes substantial delay of response with respect to variations of the duty cycle of the pulse signal, said dead bands defined by the duty cycle being higher than a predetermined maximum value or lower than a predetermined minimum value, said method comprising the steps of;

determining engine speed;

determining engine temperature;

determining an open loop control component of the control value based on the engine temperature;

determining a closed loop control component of the control value based on the actual engine speed and a difference between the actual engine speed and a reference engine speed determined corresponding to the engine temperature;

determining said pulse signal having a duty cycle representative of a sum of the open loop component and the closed loop component;

presetting maximum and minimum values of said duty cycle for defining said normal duty cycle range therebetween and limiting said duty cycle of said pulse signal to maintain same within the normal duty cycle range corresponding to said dead band;

applying said determined and limited pulse signal to said actuator; and increasing said closed loop component at a given rate when said pulse signal is determined to be less than said minimum value.

7. A method as set forth in claim 6, wherein said given rate is a function of engine speed.

8. A method as set forth in claim 1, wherein said given rate is 0.5% of said duty cycle of said pulse signal for every 128 engine cycles.

9. A method as set forth in claim 6 or 8, wherein said minimum ratio is 40% of the duty cycle of said pulse signal.

10. An intake air flow rate control system for an internal combustion engine for controlling the idle air flow rate flowing through an idle air induction passage connected for bypassing an engine throttle valve positioned in a primary air induction passage of the engine, comprising:

an idle air control valve disposed in said idle air induction passage for controlling the idle air flow rate passing therethrough;

an electromagnetically operable actuator connected for operating said idle air control valve for opening and closing said idle air control valve depending on the ratio of the energized and deenergized periods of said actuator;

an engine speed sensor for determining the engine revolution speed and producing a first sensor signal having a value representative of the determined engine speed;

an engine temperature sensor for producing a second sensor signal having a value representative of the engine temperature;

a microcomputer adapted to receive said first and second sensor signals, said microcomputer being operable to produce a reference signal indicative of a target engine speed based on the second sensor signal value and determine a control value including a closed loop component based on said first sensor signal value and a difference between said first sensor signal value and said reference signal value, and an open loop component which is based on said second sensor signal value, said microcomputer being further operable to produce a control signal having a duty cycle indicative of the determined control value and defining the ratio of said energized and deenergized periods of said actuator, said microcomputer including a memory for storing data which defines maximum and minimum values of a normal duty cycle range in which the actuator is responsive to said control signal without substantial delay, said microcomputer operable for limiting the duty cycle of the control signal to be within the range defined by said maximum and minimum values.

11. A system as set forth in claim 10, wherein said microcomputer determines said closed loop component so that the sum of said closed loop component and said open loop component becomes equal to or larger than said minimum value.

12. A system as set forth in claim 10, wherein said microcomputer determines said control value as the sum of said closed loop component and said open loop component and limits the control value at said maximum value when the sum becomes larger than said maximum value.

13. An idle engine speed control system for an internal combustion engine comprising:

a primary and an idle air induction passage;

a throttle valve disposed within said primary air induction passage for controlling primary air flow therethrough;

an idle air control valve disposed within said idle air induction passage;

an electromagnetically operable actuator associated with said idle air control valve for controlling the opening and closing of said idle control valve depending on the ratio of the energized period and deenergized period thereof;

an engine speed sensor for determining engine revolution speed and producing an engine speed signal representative of the determined engine speed;

an engine temperature sensor for determining engine temperature and producing an engine temperature signal representative of the determined engine temperature;

first means for determining a closed loop control value for closed loop control of the ratio of energized and deenergized periods of the actuator based on said engine speed signal and a reference signal, which reference signal is determined based on said engine temperature signal and is representative of a target engine speed;

second means for determining an open loop control value for open loop control of the ratio of energized and deenergized periods of said actuator, which second means determines said open loop control value as a sum of a closed loop component and an open loop component, said closed loop component being determined based on said engine speed signal value and said reference signal value, said open loop component being determined based on said engine temperature signal;

third means for defining maximum and minimum values of said open and closed loop control values, said maximum and minimum values corresponding to the maximum or minimum values of a normal value range in which said actuator follows variations of the open and closed loop control values without substantial delay time, which third means limits said control value within said normal value range; and fourth means for producing a pulse signal to be applied to said actuator, which pulse signal has a duty cycle representative of the determined open and closed loop values and defining the ratio of the energized period and the deenergized period of the actuator.

14. A system as set forth in claim 13, wherein said third means incorporates fifth means for increasing said closed loop component at a given rate when control mode is switched from closed loop control to open loop control and the closed loop control value is smaller than said minimum value.

15. A system as set forth in claim 13 or 14, wherein said third means defines said maximum and minimum values respectively as 80% and 10% of one cycle of said pulse signal.

16. A system as set forth in claim 15, wherein said third means determines said closed loop component so that the sum of said closed loop component and said open loop component becomes equal to or larger than said minimum value.

17. A system as set forth in claim 15, wherein said third means determines said control value as the sum of said closed loop component and said open loop component and limits the control value at said maximum value when the sum becomes larger than said maximum value.

* * * * *